United States Patent [19]

Spisak et al.

[11] 4,178,495

[45] * Dec. 11, 1979

[54] APPARATUS FOR WELDING STUDS TO WORKPIECES

[75] Inventors: Steve Spisak, Elyria; Thomas E. Shoup, Amherst, both of Ohio

[73] Assignee: TRW, Inc., Cleveland, Ohio

[*] Notice: The portion of the term of this patent subsequent to Feb. 14, 1995, has been disclaimed.

[21] Appl. No.: 798,141

[22] Filed: May 18, 1977

Related U.S. Application Data

[63] Continuation-in-part of Ser. No. 648,052, Jan. 12, 1976, Pat. No. 4,074,103.

[51] Int. Cl.² .............................................. B23K 9/20
[52] U.S. Cl. ..................................... 219/98; 408/126
[58] Field of Search ................ 219/98, 99; 408/124, 408/126; 173/163

[56] References Cited

U.S. PATENT DOCUMENTS

| | | | |
|---|---|---|---|
| 2,220,791 | 11/1940 | McWhirter | 408/124 |
| 3,208,722 | 9/1965 | Rodriquez | 173/163 X |
| 3,340,379 | 9/1967 | Sweeney | 219/99 |
| 4,074,103 | 2/1978 | Shoup | 219/98 |

OTHER PUBLICATIONS

"DuPont Plastics Bulletin", DuPont, Wilmington, Del., pp. 187–190, vol. 12, 1950.

Primary Examiner—E. A. Goldberg
Attorney, Agent, or Firm—Allen D. Gutchess, Jr.

[57] ABSTRACT

Apparatus is provided for welding studs to workpieces. The invention is particularly concerned with welding studs to workpieces made of materials having relatively low electrical resistance but covered with layers of other materials having higher electrical resistance, a common example being metal workpieces having painted surfaces. In order for the stud to make effective electrical contact with the workpiece at the beginning of the welding cycle, the paint must be eliminated; in accordance with the invention, this is accomplished by rotating the stud which effectively removes the portion of the paint in contact with the stud. Electrical contact can then be established between the stud and the workpiece to enable the welding cycle to be initiated.

8 Claims, 6 Drawing Figures

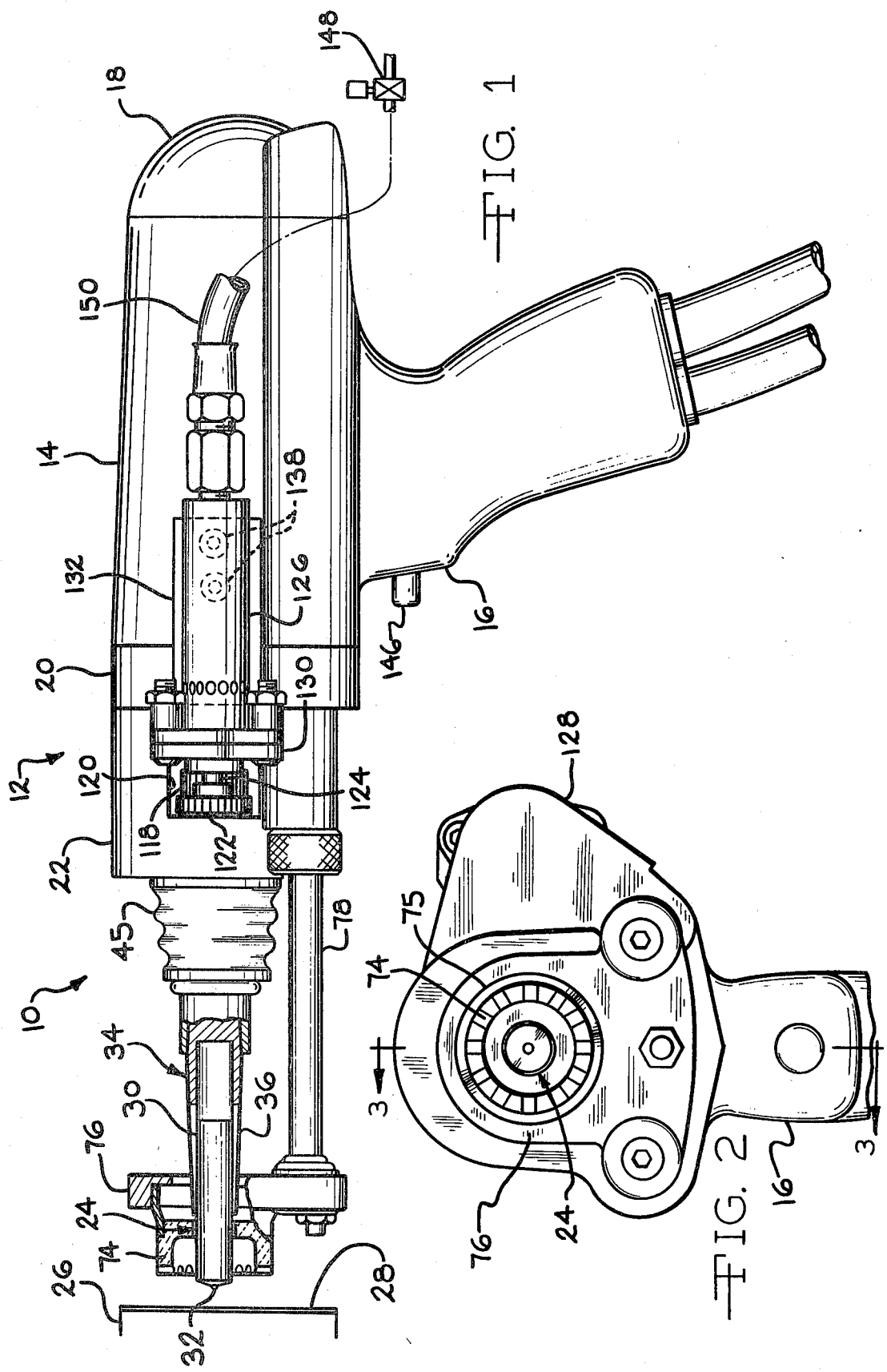

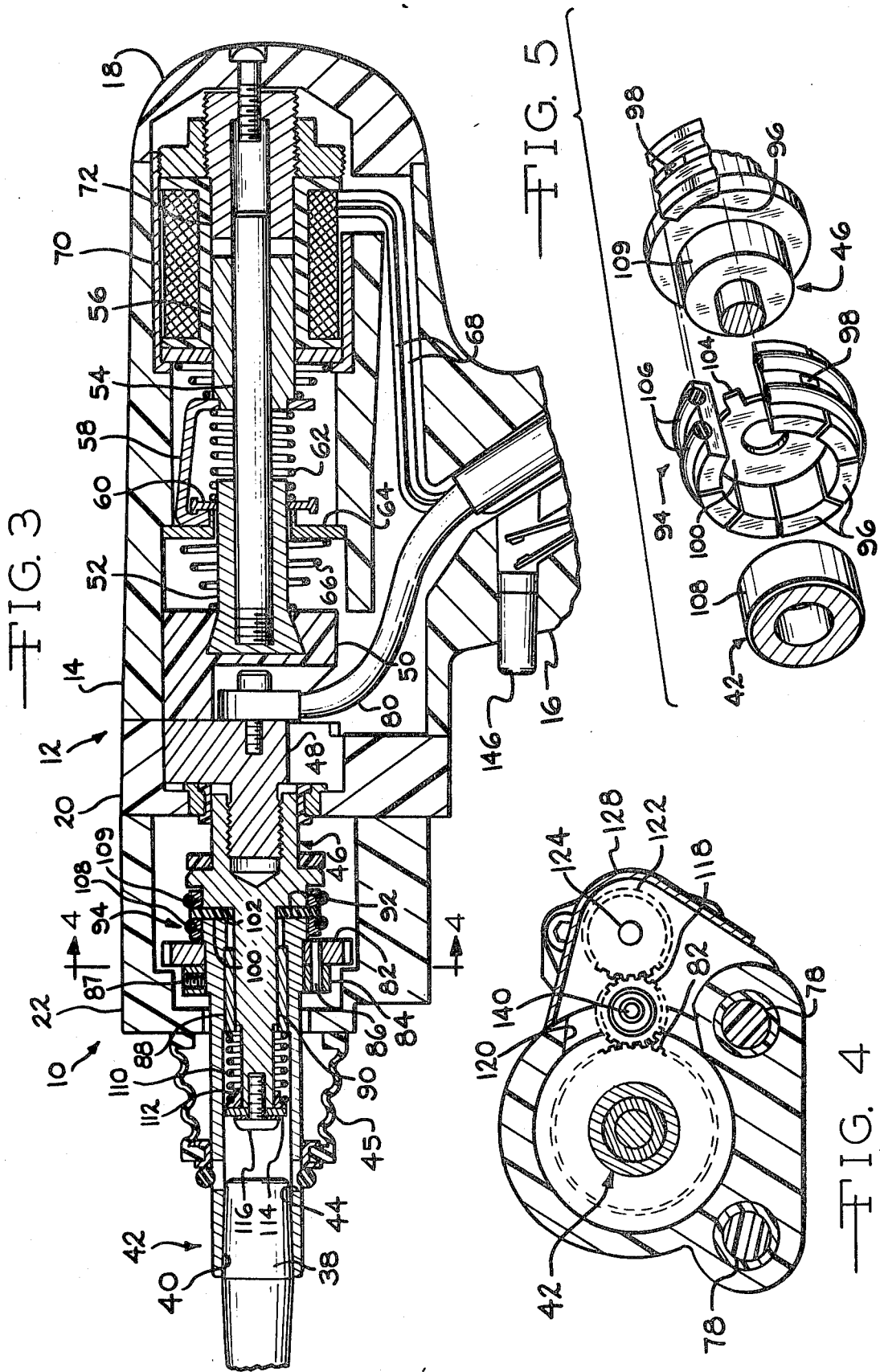

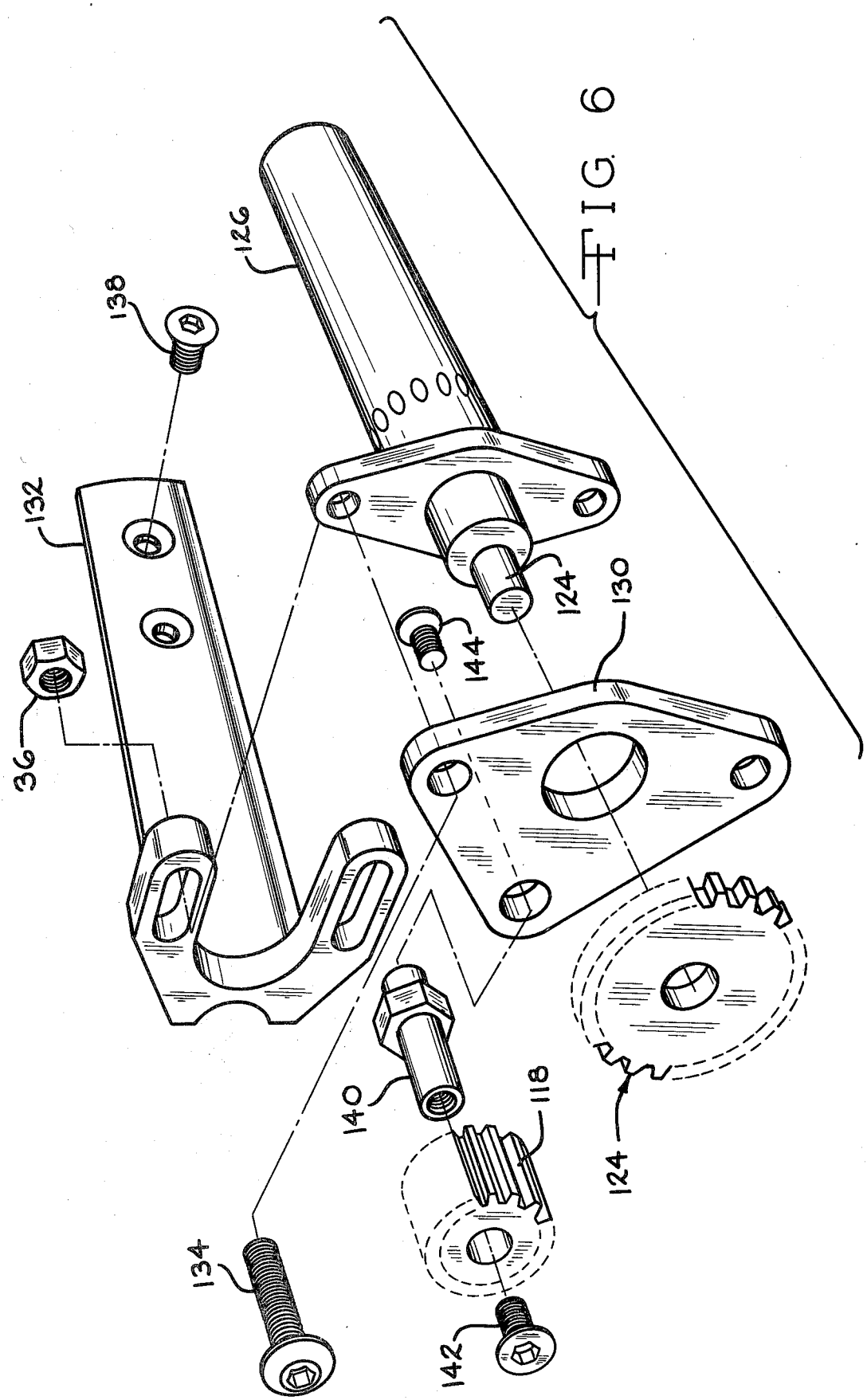

APPARATUS FOR WELDING STUDS TO WORKPIECES

This is a continuation-in-part of my co-pending application, Ser. No. 648,052, filed Jan. 12, 1976, now U.S. Pat. No. 4,074,103

This invention relates to apparatus for welding a stud to a workpiece having a layer of electrically-resistant material thereon.

Welding studs to workpieces, particularly by a drawn-arc technique, is becoming more widely accepted and finding more and more applications. In some of these applications, the workpiece to which the stud is to be welded has a layer of material thereon which has a relatively high electrical resistance. In such instances, it is necessary to remove at least a portion of that layer to provide an effective electrical path between the stud and the workpiece before the stud can be welded thereto. Such materials are commonly paint or similar coating material, but can also be rust, scale, or corrosion, by way of example. Heretofore, such layers have commonly been removed manually by the operator by the use of a wire brush, scraper, abrasive wheel, etc. prior to welding. This is time-consuming and laborious. Some attempts have also been made to remove the layer automatically, but such have been slow or inoperative on certain types of materials or thick layers, or have had other disadvantages.

The present invention provides apparatus for removing the material between the stud and the workpiece by rotation of the stud while in contact with the material layer. This has been found to be relatively rapid and efficient and is more effective on thicker layers and certain materials than with approaches heretofore taken.

In a preferred form, the rotation of the stud is accomplished through a motor mounted on the welding tool. The motor is small and light in weight, and can be automatically operated when the trigger of the tool is actuated. A chuck of the welding tool has a gear mounted thereon which meshes with an intermediate gear. The latter gear meshes with a drive gear driven by the motor. The intermediate gear is of a nonconducting material so that the drive gear and motor will not be electrically hot. The driven gear, of course, moves with the chuck as the chuck is raised and lowered during a welding cycle to move a stud from the workpiece and back again but is always in full contact with the intermediate gear.

The welding tool also has improved electrically conducting members in contact with the rotatable chuck and also with nonrotatable moving means in the tool which moves the chuck toward and away from the workpiece. The welding current is supplied through the moving means to the chuck and, with the heavy currents involved, the conducting members must be properly designed to prevent arcing. For this purpose, several arcuate conducting members are located around adjacent portions of the chuck and the moving means and are urged into contact with both by resilient bands mounted therearound. In a preferred form, a nonconducting washer is located between the chuck and the moving means and has projections engaged with the arcuate members to maintain them in spaced relationship.

It is, therefore, a principal object of the invention to provide improved apparatus for welding studs to workpieces having electrically-resistance layers thereon.

Another object of the invention is to provide apparatus for welding studs to workpieces having electrically-resistant layers thereon, which apparatus employs a gear drive.

A further object of the invention is to provide apparatus for welding studs to workpieces having electrically-resistant layers thereon, which apparatus has improved electrical conducting members for connecting nonrotating and rotating portions of the apparatus.

Many other objects and advantages of the invention will be apparent from the following detailed description of preferred embodiments thereof, reference being made to the accompanying drawings, in which:

FIG. 1 is a side view in elevation, with parts broken away and with parts in cross section, of a stud welding tool embodying the invention;

FIG. 2 is a fragmentary front view in elevation of the stud welding tool of FIG. 1;

FIG. 3 is a view in longitudinal, vertical cross section taken along the line 3—3 of FIG. 2;

FIG. 4 is a view in transverse cross section taken along the line 4—4 of FIG. 3;

FIG. 5 is a detail, exploded view in perspective of a component of the tool embodying the invention; and FIG. 6 is a somewhat schematic exploded view in perspective of a mounting arrangement for a component of the tool.

Welding of various studs to workpieces is finding wider and wider applications and is being used more and more in manufacturing operations. Frequently, the manufacturing process requires that the studs be welded to workpieces or partially finished products after they have been painted or at least after a primer has been applied thereto. Such a coating material usually exhibits a high electrical resistance and requires removal in the area to which the stud is to be welded prior to the welding cycle. Heretofore, this has commonly been done by the operator employing a scraper, wire brush, abrasive wheel, or the like, necessitating the use of more labor and time. Some attempts have been made to overcome the electrical resistance of the paint through the use of high frequency current between the stud and the workpiece. This has not been effective as desired and the high frequency often disturbs other electrical operations or apparatuses. Attempts also have been made to remove the paint by rapidly reciprocating the stud to peck at the paint. This has lacked reliability in penetration of the paint under many conditions and "breakthrough" time is relatively long, especially on paint that has been on the product for some time.

The present apparatus involving rotation of the stud to remove the electrically-resistant layer is substantially more reliable for removing various types and thickness of layers, and is also more effective in removing coating material or paint that has been applied for more than just a few days to the workpiece or product. The "break-through" time is also substantially shorter in most instances and the disadvantages of previous approaches are not encountered with the stud rotation technique according to the invention.

The stud is rotated by rotating the chuck adapter which holds the chuck in which the stud is located. In a preferred form, the chuck adapter is rotated by a small motor mounted on the side of the welding tool. A small, lightweight motor can be used for this purpose which does not interfere to any degree with the operation of the welding tool. The chuck adapter can have a pinion gear extending radially outwardly therearound and meshing with an intermediate gear rotatable carried by the tool. The intermediate gear, in turn, meshes with a drive gear driven by the motor. The intermediate gear preferably is of a nonconducting material to prevent the drive gear and the motor from being hot. Further, the driven or intermediate gear is of a sufficient width to assure continuous meshing between these gears for any position of the chuck adapter and the chuck during the welding cycle.

The welding tool also is provided with improved electrically-conducting arcuate members which are in contact with both the chuck adapter and moving means for moving the adapter and the chuck away from and toward the workpiece. The arcuate members are maintained in electrical contact with adjacent cylindrical portions of the chuck adapter and the moving means by resilient bands located therearound. The arcuate members are also maintained in spaced relationship by a nonconducting disc or washer located between the chuck adapter and the moving means and connected to each of the arcuate members.

With this arrangement, the penetration of the rotating stud through the electrically-resistant layer is rapidly accomplished so that little time is added to the overall welding cycle and no additional labor is required to remove the paint. Of course, the invention is also applicable to electrically-resistant layers on workpieces other than paint or similar coating material. Thus, the invention can be advantageously used with workpieces which are rusted or corroded or have scale or other electrically-resistant contaminants thereon.

Referring now to the drawings and particularly to FIG. 1, a welding tool 10 preferably is used to weld a stud to a workpiece by a drawn-arc tenhnique. For this purpose, the tool includes means for retracting the stud from the workpiece, means for holding the stud in the retracted position, and means for subsequently moving the stud toward and against the workpiece. A power source and controls impose a voltage between the stud and the workpiece as the stud is withdrawn to form a pilot arc. The controls also determine when the stud is plunged back toward the workpiece, and when a higher current is imposed on the pilot arc to establish a main welding arc between the stud and the workpiece. The main welding arc melts a portion of the end of the stud and a portion of the workpiece, with the molten metal portions then joining and solidifying as the stud engages the workpiece, to provide a secure weld therebetween.

The stud welding tool 10 includes a main body or housing 12 of a suitable dielectric material, the body having a main section 14, a grip or handle 16, a separable rear end cap 18, a front extension 20, and a forward end section or cover 22. A stud 24 of FIG. 1 is about to be positioned against a workpiece 26 to be welded thereto. In this instance, the workpiece 26 is of a metal or other material having a low resistance to electricity and has a layer 28 thereon having a higher resistance to electricity. The stud 24 includes a main shank 30 and a tip 32 of welding flux located at the forward, weldable end of the stud. The flux can be of various materials and can even be in powder form and suitably encapsulated at the end of the stud. Some small diameter studs may not require any flux at all, with the end of the stud simply pointed to some degree.

The stud 24 is held in a stud holder or chuck 34 having slots forming fingers 36 which resiliently engage the shank 30 of the stud 24. The chuck requires replacement from time-to-time and for this purpose, it has a tapered rearward end 38 (FIG. 3) which is received in and frictionally held by a tapered recess 40 of a chuck holding means or chuck adapter 42. The adapter has transverse openings 44 located near the rear extremity of the chuck 34 so that a tapered bar or pin can be inserted therein to force the chuck 34 out of the adapter. A dust bellows 45 is also positioned around a portion of the adapter 42 and extends to the cover 22.

The chuck adapter 42 is rotatably mounted on an extension or shank 46 located in the cover 22. The extension is part of moving means for moving the stud and the chuck toward and away from the workpiece with the extension specifically being threadably engaged with a conventional cable clamp 48 which, in turn, is affixed to a lifting rod head 50 by side screws (not shown). The head 50 is connected to a lifting rod or stem 52 and to a guide rod 54 extending rearwardly through a movable core 56. A lifting hook 58 is attached to the core 56 and engages a lifting ring 60 when moved rearwardly.

The inner diameter of the lifting ring 60 slightly exceeds the outer diameter of the lifting rod 52 so that the rod 52 can move longitudinally relative to the ring when the ring is perpendicular thereto. The ring is normaly held in that position by a lifting ring spring 62 which urges the ring against a rear extension of a stop plate 64. The plate 64 is held against shoulders in the main section 14 of the housing 12 by a main plunge spring 66. With this design, the lifting rod 52 can be moved back somewhat when the stud 24 is pressed against the workpiece prior to being welded. However, when the ring 60 is moved by the lifting hook 58 to a canted position, further retraction of the core 56 also causes the lifting rod 52 to retract or move the same distance as the core. Consequently, all of the studs to be welded will be retracted a uniform, predetermined distance from the workpiece by the moving means during the lifting or retraction stroke, even though their length may differ somewhat so that some are pushed back more than others when initially pressed against the workpiece.

The movable core 56 is retracted when current is supplied through suitable leads 68 to a lifting or holding coil 70. The extent of the rearward movement or the core 56, which determines the distance the stud and the chuck are retracted, is determined by the position of an adjustable core piece 72.

When the stud 24 is initially pressed against the workpiece, it is retracted until the outer end of a ferrule 74 (or spark shield, if used as a substitute) bears against the workpiece 26, or, specifically, against the layer 28. The ferrule is held by a grip 75 mounted in a holder or foot 76 which is supported by adjustable legs 78. These can be moved in and out relative to the body 12 of the tool to determine the position of the foot and the ferrule.

The components of the tool 10 discussed to this point are substantially conventional and operate in a substantially conventional manner, with the exception of the design of the adapter 42 and the extension 46. When the welding cycle is initiated, a voltage is imposed between the stud and the workpiece through a welding cable 80 connected to the cable clamp 48. Substantially at the same time, the coil 70 is energized to retract the movable core 56 and the stud 24 from the workpiece to draw a pilot arc therebetween. A heavier voltage is then imposed between the stud and the workpiece through the cable 80 causing a welding arc to be established. After a predetermined time, the coil 70 is deenergized to enable the plunge spring 66 to plunge the stud back toward the workpiece. The welding arc will have formed molten portions on the stud and the workpiece prior to the contact therebetween at the end of the plunge stroke. However, if the layer 28 prevents sufficient electrical contact between the stud 24 and the workpiece 26, the controls are designed so that the welding cycle will not be initiated at all. If such prevention is not designed into the controls, the cycle may commence with the stud being retracted, but no pilot arc and subsequently no welding arc will be established, with the result that no weld will be made.

In accordance with the invention, by rotating the stud 24, the tip 32 will penetrate the layer 28 to establish the proper electrical contact. For this purpose, the chuck adapter 42 has a driven gear 82 affixed thereon near its rearward end. The gear 82 is connected to a mounting ring 84 through a plurality of pins 86 with the mounting ring, in turn, being affixed on the adapter 42 by setscrews 87. When the gear is driven, the chuck adapter 42 rotates on a sleeve bearing 88 which is located on a shank 90 of the chuck adapter extension 46. The adapter has a large rear annular surface 92 bearing against electrically-conducting means 94.

The electrically-conducting means 94, as particularly shown in FIG. 5, includes a plurality of arcuate segments 96, eight in this instance, each having a central opening 98. An insulating disc or washer 100 is located between the rear annular surface 92 of the chuck adapter 42 and a forward annular surface 102 of the chuck adapter extension 46. The washer 100 has a plurality of outwardly extending projections 104 spaced uniformly therearound and engagable with the openings 98 of the segments 96. With this arrangement, the segments 96 are maintained in spaced relationship at all times. Otherwise, they would have a tendency to gather or bunch up and leave a wide gap at one location. Two resilient rings 106 are located around the segments 96 on each side of the insulating washer 100 and urge the segments against a cylindrical surface 108 of the adapter 42 and a surface 109 of the extension 46. The segments 96 remain in contact with the surfaces 108 and 109 even during the lift stroke of the tool when the extension 46 tends to separate from the adapter 42.

To hold the insulating washer 100 in position between the surfaces 108 and 109, a compression coil spring 110 is located around a forward portion of the extension shank 90 with the rear end of the spring bearing against the sleeve bearing 88 and the forward end of the spring bearing against a seat 112 of insulating material. The seat 112 is held in position by a washer 114 and a centrally-located screw 116. The spring 110 thereby maintains the adapter extension 46 and the adapter 42 in contact with the washer 100 while the resilient rings 106 maintain the segments 96 in contact with the cylindrical surfaces 108 and 109 of the chuck adapter and the extension. This relatively large contact area between the components enables the current to flow from the cable 80 to the stud 24 with little resistance between the nonrotating chuck adapter extension 46 and the rotating chuck adapter 42.

The gear 82 on the adapter 42 is driven through an intermediate or idler gear 118 which is made of insulating material to prevent the possibility of passing current from the gear 82. The gear 118 extends through an opening 120 (FIG. 1) in the front cover 22 and meshes with a drive gear 122 which is mounted on a drive shaft 124 of a small drive motor 126. The gears 118 and 120 are enclosed in a shroud 128 (FIGS. 2 and 4) which is removed in FIG. 1. The motor 126 is mounted on a supporting plate 130 (FIG. 6) which is affixed to a bracket 132 by fasteners 134 and nuts 136. The bracket, in turn, is mounted on the side of the main section 14 of the welding tool body by suitable fasteners 138. The idler gear 118 is rotatably carried on the mounting plate 130 by an idler shaft 140, being held by a screw 142. The shaft 140 is affixed to the plate 130 by a screw 144. The motor 132 can be air driven and is light in weight as well as being small. Consequently, the rotating drive means does not add appreciably to the weight of the tool and does not hamper the operation of it.

The gears 82 and 118 are of a sufficient width to assure that they will always be in mesh when the chuck and stud are retracted and subsequently plunged back toward the workpiece during a welding operation. There is no strain on the gears during the movement of the chuck and hence there is no possibility of failure of the gears due to such movement as has occurred with mechanisms heretofore employed.

In the operation of the welding tool 10 with the stud rotation means, when a trigger 146 is pulled to close its electrical switch contacts, an air control valve 148 in an air supply line 150 for the motor 126 is opened to supply air thereto and to cause the chuck adapter 42, the chuck 34, and the stud 24 to rotate. The rate of rotation is not critical, but rates of 500 to 1,000 rpm of the chuck adapter 42 have been satisfactory. The pressure of the air determines the speed of the motor 126, with a pressure of 70 psi producing a speed of 650 rpm for the motor, by way of example. When effective electrical contact is established between the stud 24 and the workpiece 26 through the layer 28, the stud welding cycle is then initiated. This can be done automatically and at this time, the valve 148 for the motor 126 can be closed to stop the rotation of the stud 24. However, it is not essential that the stud rotation be terminated immediately upon the initiation of the welding cycle since even if rotation is continued throughout the welding cycle, when the stud 24 is welded to the workpiece at the end of the plunge stroke of the stud, the now-stationary, welded stud will simply slip in the chuck 34 as the latter continues to rotate.

While the stud is rotating, a voltage can be imposed between the stud and the workpiece through the layer 28. Particularly with paint, the resulting heat from the current can help to soften the layer. In such an instance, the current can be shut off before the stud is stopped, to assure that the stud will not be resistance-welded to the workpiece.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. Apparatus for welding a stud to a workpiece having an electrically-resistant coating thereon, said apparatus comprising a welding tool having chuck holding means extending outwardly therefrom for holding a weldable stud, means for moving said chuck holding means toward and away from the workpiece, means connected to said chuck holding means for rotating said chuck holding means, a disc positioned between portions of said chuck holding means and said moving means and in contact with both, electrically-conducting arcuate members located around said disc, and means for urging said members inwardly against portions of said chuck holding means and said moving means.

2. Apparatus according to claim 1 characterized by each of said arcuate members having an opening therein, and said disc having projections extending into said openings to maintain said arcuate members in spaced relationship.

3. Apparatus according to claim 1 characterized by said urging means comprising two elastic bands encircling said arcuate members on each side of said disc.

4. Apparatus according to claim 3 characterized by said portions of said chuck means and said moving means are cylindrical.

5. Apparatus according to claim 1 characterized by said disc being made of a nonconducting material.

6. Apparatus for welding a stud to a workpiece having an electrically-resistant coating thereon by a drawn-arc welding cycle which includes plunging the stud toward the workpiece from a retracted position, said apparatus comprising a welding tool having a chuck adapter for holding a chuck, means for establishing an electrical potential between the chuck adapter and the workpiece, means for moving said chuck adapter toward and away from the workpiece, a bracket extending outwardly from a side of said tool, a supporting plate carried by said bracket, a motor carried by said bracket, a driven toothed member connected to and rotatable with said chuck adapter and extending circumjacent thereof, a drive toothed member rotated by said motor, an intermediate toothed member rotatably carried by said supporting plate and connecting said driven toothed member and said drive toothed member for causing said driven toothed member to rotate when said drive toothed member is rotated by said motor, said driven toothed member and said intermediate member having widths sufficient to enable said driven and intermediate toothed members to remain in mesh for any position of said chuck adapter during a welding cycle.

7. Apparatus according to claim 6 characterized by said intermediate toothed member having a width exceeding the length of the plunge stroke of said chuck adapter to enable said driven and intermediate toothed members to remain in mesh for any position of said chuck adapter during a welding cycle.

8. Apparatus according to claim 6 characterized by said intermediate toothed member being made of a nonconducting material.

* * * * *